No. 701,209. Patented May 27, 1902.
C. LUKE.
COVERING MEANS FOR JOINTS IN ELECTRIC CABLES.
(Application filed Mar. 10, 1902.)
(No Model.)
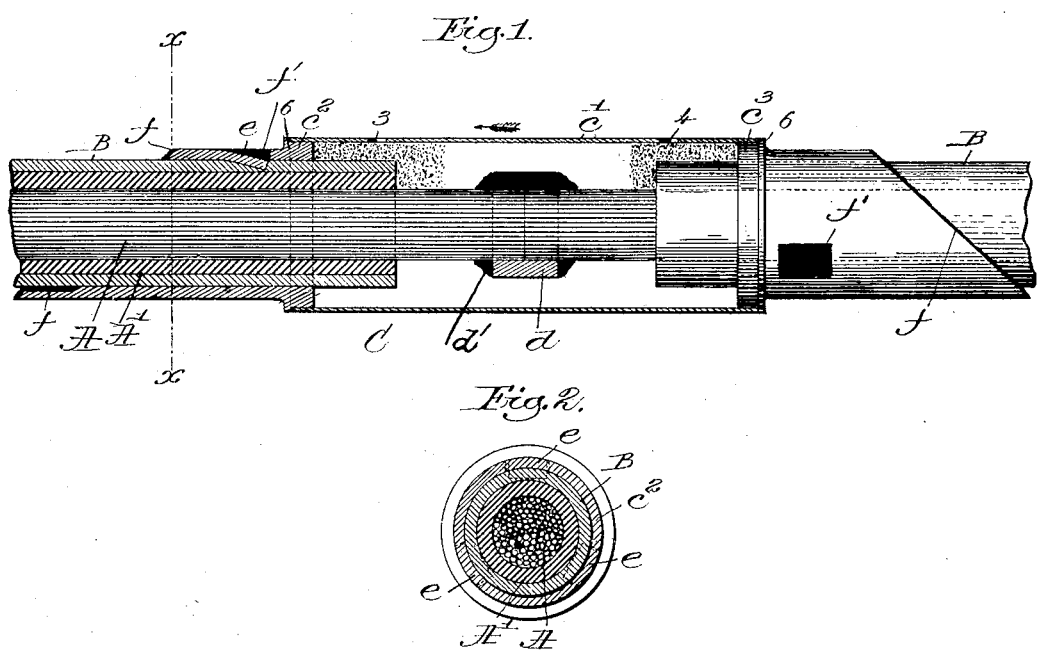
Witnesses:
W. C. Linsford.
Fred S. Greenleaf.
Inventor.
Charles Luke,
by Bradley Gregory
Attys.

UNITED STATES PATENT OFFICE.

CHARLES LUKE, OF MILFORD, CONNECTICUT, ASSIGNOR TO THE NEW HAVEN NOVELTY MACHINE COMPANY, OF NEW HAVEN, CONNECTICUT.

COVERING MEANS FOR JOINTS IN ELECTRIC CABLES.

SPECIFICATION forming part of Letters Patent No. 701,209, dated May 27, 1902.

Application filed March 10, 1902. Serial No. 97,532. (No model.)

*To all whom it may concern:*

Be it known that I, CHARLES LUKE, a citizen of the United States, residing at Milford, county of New Haven, State of Connecticut, have invented an Improvement in Covering Means for Joints in Electric Cables, of which the following description, in connection with the accompanying drawings, is a specification, like characters on the drawings representing like parts.

The cables used in circuits for electric lighting and power are united at intervals, and much difficulty is experienced in protecting the cable where spliced, so that moisture and dampness cannot get to the wires or conductors. The central core of the cable is composed of numerous copper wires surrounded by an insulating medium, and the insulating medium is inclosed in a lead pipe, and where the ends of the copper wires are to be joined the insulating medium and the lead covering are cut away.

I have devised means for covering water and moisture tight the joint at the ends of two lengths of cable.

Figure 1 shows the ends of two lengths of cable united and covered by the means devised by me; and Fig. 2 is a section in the line $x$, Fig. 1.

The central core A of the cable, composed of any desired number of separate copper wires, is incased in an insulating medium $A'$, supposed to be composed of india-rubber or other insulating compound, and the insulating medium is sheathed or incased, preferably, by lead pipe B. To splice the ends of the wires of the cable the insulating medium and the lead pipe are removed to expose the wires that they may be soldered together to act as a continuous cable.

My novel cover C is composed of a metallic sleeve $c'$, having extended from its ends hollow hubs $c^2$ $c^3$, represented as inclined, the holes in the hubs substantially filling the exterior of the lead pipe. Before uniting the ends of the cable the sleeve having its hubs securely attached, preferably by solder or otherwise, water-tight is slipped over the end of one of the lengths of cable, and the ends of the wire are brought in contact, as shown in Fig. 1, inside of a metallic ring $d$, and thereafter by usual solder or brazing material $d'$ is applied to the ring $d$ and the wire and the electrical junction of the wires is effected. This done, the sleeve is moved along the cable into the position Fig. 1, and if the movement of the sleeve was in the direction of the arrow the hub $c^2$ was passed over the end of the lead pipe at the left of the junction of the cable. When the sleeve is in proper position and the sheath or covering is of lead pipe, the sleeve is locked firmly in place by means of locking means $e$, shown as prongs carried by the hubs, said prongs being struck and their ends inturned, as shown at the left, Fig. 1, to enter the pipe more or less, to thus fix the sleeve and hubs with relation to the pipe. After this I may apply solder to the inclined outer ends of the hubs $c^2$ $c^3$, as at $f$, the solder running down the inclined surfaces at the ends of the hubs and filling the pipe, thus making a water-tight joint between the hubs and the pipe. I may also fill the spaces left by inturning the prongs $e$ with solder, as shown at $f'$. The sleeve is provided with two open holes 3 4. Any suitable insulating medium may be poured into the holes 3 until the sleeve is filled, the insulation surrounding the lead pipe and the wire of the cable, the air escaping through the hole 4. After the sleeve has been filled the holes 3 and 4 may be closed by solder or otherwise.

The connection shown may be applied to the cable quickly, and it affords complete protection against water or moisture getting to the cable, and, further, it acts to prevent longitudinal movement of one part of the cable with relation to another part that might put strain on the joint made in the ring $d$.

The hubs $c^2$ $c^3$ are reduced externally to enter the ends of the sleeve and about a shoulder 6, each hub abutting a shoulder of the sleeve.

Having described my invention, what I claim as new, and desire to secure by Letters Patent, is—

1. Covering means for spliced joints of sheathed cables, comprising a sleeve having extended fixed hubs embracing the sheath of each cable at opposite sides of the junction of the ends of the wires of the cables, leaving the ends of the sheaths inside the sleeve that said ends and the wires of the cables may be inclosed by an insulating medium run into the sleeve.

2. Covering means for spliced joints of sheathed cables, comprising a sleeve having extended fixed hubs embracing the sheath of each cable at opposite sides of the junction of the ends of the wires of the cable, leaving the ends of the sheaths inside the sleeve that said ends and the wires of the cables may be inclosed by an insulating medium run into the sleeve, the ends of said hubs being inclosed and soldered to the sheaves of the cables.

3. Covering means for spliced joints of sheathed cables, comprising a sleeve having extended fixed hubs to embrace the sheaths of the cables at opposite sides the junction of the ends of the wires of the cables, and locking means to affix the hubs to the sheaths of the cables outside the ends of the sleeve.

4. Covering means for the spliced ends of wire cable, comprising a sleeve, a hub fixed in one end of the sleeve and to the cable inside the sleeve, and an insulating medium run into said sleeve and surrounding said spliced ends and the end of the covering of the cable inside the sleeve.

In testimony whereof I have signed my name to this specification in the presence of two subscribing witnesses.

CHARLES LUKE.

Witnesses:
 GEO. W. GREGORY,
 THOMAS J. DRUMMOND.